March 22, 1966 E. E. KELLER 3,241,260
FISHHOOK ASSEMBLY
Filed May 4, 1964
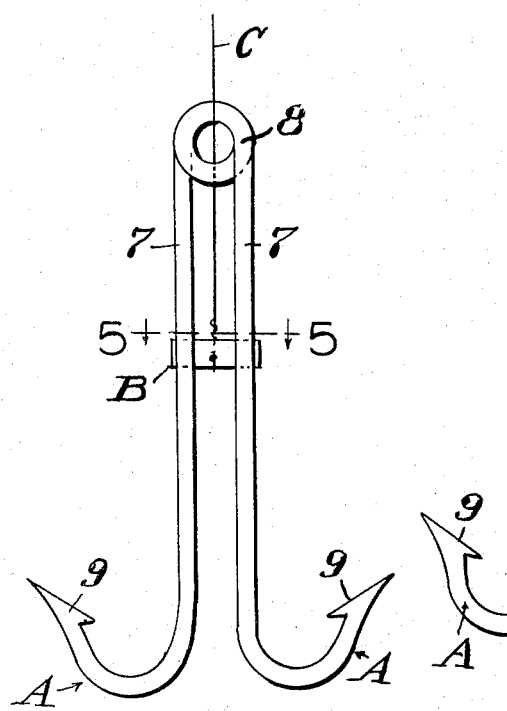
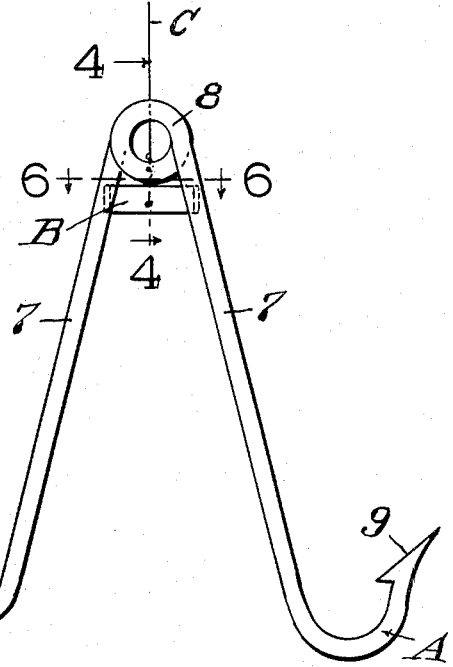
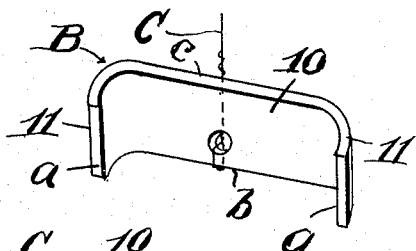
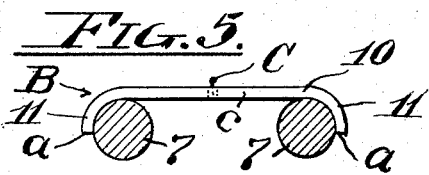
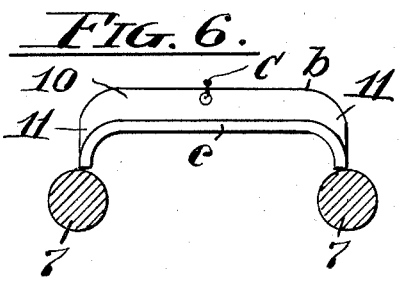
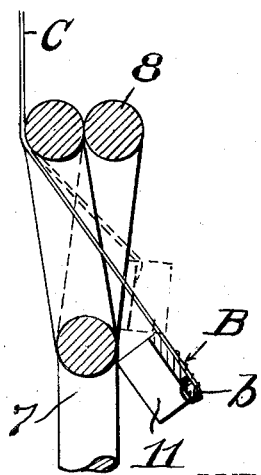
INVENTOR
Ernest E. Keller
BY R. S. Berry
ATTORNEY United States Patent Office 3,241,260
Patented Mar. 22, 1966

3,241,260
FISHHOOK ASSEMBLY
Ernest E. Keller, Bell, Calif., assignor of one-half to
R. S. Berry, Inglewood, Calif.
Filed May 4, 1964, Ser. No. 364,410
1 Claim. (Cl. 43—36)

This invention relates to fishhooks and has as its primary object the provision of a fishhook assembly embodying a pair of fishhooks having the shanks thereof interconnected at their outer ends and normally disposed in divergent relation to each other under spring pressure and embodying releasable means for holding the fish hooks in a contracted position relative to each other, operable under the influence of a pull imparted on the hooks relative to the line to which they are attached, as when the hooks are mouthed by a fish, to permit automatic spreading of the hooks relative to each other and thereby prevent or at least minimize ejection of the hooks from the mouth of the fish, thus greatly enhancing the fishing operation.

A further object is to provide a fishhook embodying a pair of spring pressed normally diverging shanks together with a clip whereby the shanks may be releasably held in contracted relation to each other, wherein the clip is attached to a fishline in such manner that on sufficient pull being imparted to the line the clip will be disengaged from the shanks and the latter thereby permitted to automatically advance to their divergent position, and wherein an arrangement is provided whereby the clip will serve as a connection between the fishline and the fishhooks.

Another object is to provide a fishhook of the above character which is simple and economical in construction and highly efficient in operation.

With the foregoing objects in view the invention is carried into effect as illustrated by way of example in the accompanying drawings, in which:

FIG. 1 is an elevational view of the fishhook assembly showing the pair of fishhooks in their contracted position;

FIG. 2 is a view similar to FIG. 1 showing the hooks in their normal divergent position;

FIG. 3 is an isometric view of a clip for releasably holding the pair of hooks in their contracted position showing it detached;

FIG. 4 is an enlarged vertical section and elevation taken on the line 4—4 of FIG. 2 showing the clip applied in its retracted position;

FIG. 5 is an enlarged detail in section and plan as seen on the line 5—5 of FIG. 1; and FIG. 6 is an enlarged detail in section and plan taken on the line 6—6 of FIG. 2.

Referring to the drawings more specifically A—A indicates a pair of conventional wire fishhooks having elongate rigid shanks 7—7 which, in carrying out the invention are interconnected at their outer ends by a spring 8 formed in continuation of the shanks.

The spring 8 is here shown as comprising a resilient coil tensioned to normally maintain the shanks 7—7 in divergent relation to each other to dispose the hooks A—A spread apart in angular relation to each other, as shown in FIG. 2. The fishhooks A—A embody the usual barbs 9—9 and are arranged back-to-back with the barbs projecting in opposite directions.

The spring 8 comprises a pair of helical convolutions the ends of which terminate in the shanks 7—7 with the shanks leading from the spring at opposite ends thereof. The shanks 7—7 are designed to be disposed in substantially parallel relation to each other in opposition to the thrust of the spring 8 with the hooks A—A in contracted relation to each other as shown in FIG. 1.

Means are provided for releasably holding the fishhooks in their contracted position and at the same time serve as a connection between the fishhooks and a fishing line. This means comprises a clip B embodying a rigid flat faced strip or bar 10 having inturned ends constituting shank engaging jaws 11—11. The bar 10 is designed to be positioned to extend cross-wise of the shanks with the jaws 11—11 overlying and slidably engaging the opposed outer side of the shanks 7—7 as shown in FIG. 5.

The jaws 11—11 are spaced apart a distance less than that extending between the diverging outer sides of the shanks 7—7 at the outer ends thereof when the shanks are in their spread apart position, so that when the jaws 11—11 are engaged with the shanks as above stated, the shanks will be held in their contracted relation to each other.

The shanks 7—7 are cylindrical in cross section and the jaws 11—11 of the plate 10 are arcuate in cross section so that when the plate 10 is positioned against the shanks 7—7 intermediate the ends thereof, the end flanges 11—11 will slidably conform to the opposed outer marginal portions of the shanks 7—7 with the ends margins a—a of the flanges 11—11 overlying the frontal or outer face portions of the shanks in slightly hooked engagement therewith thereby holding the shanks against spreading under the urge of the spring 8 and yet permit their disengagement from the shanks by pulling the clip B outwardly away 11—11 overlying the frontal or outer face portions of the shanks in slightly hooked engagement therewith thereby holding the shanks against spreading under the urge of the spring 8 and yet permit their dis-engagement from the shanks by pulling the clip B outwardly away from the shanks 7—7 so that the jaws 11—11 will slide out of engagement with the shanks as shown in FIG. 6. Connected to the bar 10 of the clip B intermediate its ends is a fishline C which is passed through the loop of the spring 8 from one end of the spring to the other and is connected with a fishing rod or reel in a usual manner.

While the line C may be connected to the bar 10 in any suitable manner, it is desirable to attach the line to the lower margin b of the bar as here shown, and to pass the line upwardly over the side of the bar presented away from the shanks 7—7, and to direct the line forwardly over the upper margin c of the bar through the interior of the spring 8 from back to front as shown in FIG. 4.

Normally the clip B dangles on the line C free of the shank 7—7 and when the line is drawn taut is disposed in abutting relation to the spring as indicated in dotted lines in FIG. 4; the bar 10 being of a length exceeding the internal diameter of the spring 8 so that the bar when positioned against the spring will span the opening of the spring with the ends of the bar abutting against the inner end of the spring. By this construction the clip B, when dis-engaged from the shanks 7—7, will serve as a connection between the line C and the fishhooks A—A.

In the operation of the invention, either one or both of the fishhooks A—A is baited, and where both hooks are baited they are preferably baited independently so as to permit movement of the hooks toward and away from each other.

The shanks 7—7 are then manually contracted relative to each other, whereupon the clip B is positioned astride the shanks intermediate their ends with the end flanges 11—11 overlying the shanks so as to be abutted by the latter on being released. The shanks 7—7 will then be held in their relatively contracted position by the clip B as shown in FIG. 5.

The hooked inter-engagement of the flanges 11—11 with the hook shanks prevents free separation of the flanges and shanks, and offers sufficient resistance to separation of the clamp B from the shanks as is occasioned by an outward pull imparted to the clamp relative to the shanks when casting the baited hooks, thus permitting such casting in the usual manner without disengaging the clamp from the shanks. However, such resistance is sufficiently slight that a pull imparted on the line C as when the baited hooks are mouthed by a fish with the line held taut by the fisherman, such pull will swing the clip B rearwardly and upwardly free of engagement with the hook shanks so that the latter together with the hooks 9—9 will instantly spread apart under the urge of the spring 8 from the contracted position shown in FIG. 1 to the expanded position shown in FIG. 2. The sudden forceful spreading of the hooks 9—9 occurring within the mouth or throat of a fish will usually thrust the hooks into hooked engagement with the walls of fish's mouth or throat so as to prevent expulsion of the hooks and insuring a catch.

Disengagement of the clip B from the shanks 7—7 during the fishing operation is facilitated by the connection of the line C to the lower margin $b$ of the clip and leading the line upwardly across and over the top margin $c$ of the clamp and through the loop of the spring 8 from the back to the front thereof, since by this arrangement on opposing pull on the line and clamp will rock the clamp upwardly out of engagement with the shanks 7—7 as shown in full lines in FIG. 4. Such pull will advance the clip B into overlying abutting relation to the spring 8 so as to afford a connection between the clip B, line C, and fishhook assembly such that the latter may be retrieved by continued pull on the line.

The recited rocking movement of the clip is effected by reason of the inner face and upper margin of the clip being seated against the shanks 7—7 and by reason of the pull of the line C being imparted outwardly and upwardly on the lower margin of the clip.

I claim:

In a fishhook assembly embodying a pair of fishhooks having elongate cylindrical shanks, a coil spring interconnecting the outer ends of said shanks tensioned to normally spread said shanks apart, a fishline leading loosely through the coils of said spring having an outer end, a bar fixed to the outer end of said line adapted to loosely abut said spring to afford a connection between said line and said shanks on an opposed pull being imposed between said line and shanks, said bar having inturned end flanges slidably engageable with said shanks and operable to releasably hold said shanks in contracted relation to each other, said inturned end flanges being laterally disengageable from said shanks by a pull being imposed on said bar by said line; the improvement consisting in said flanges each having a length slightly greater than a radius of one of said cylindrical shanks and being curved throughout its length to conform to said cylindrical shank in hooked engagement therewith so as to initially resist lateral disengagement of said flanges from said shanks and thereby prevent free separation of the flanges and shanks.

References Cited by the Examiner
UNITED STATES PATENTS

| | | | |
|---|---|---|---|
| 157,480 | 12/1874 | Perry | 43—36 |
| 387,015 | 7/1888 | Smith | 43—36 |
| 1,518,166 | 12/1924 | Sharp | 43—36 |
| 2,223,946 | 12/1940 | Binkowski | 43—36 |

SAMUEL KOREN, *Primary Examiner.*

ABRAHAM G. STONE, *Examiner.*